United States Patent [19]

Hirase et al.

[11] Patent Number: 5,685,566
[45] Date of Patent: Nov. 11, 1997

[54] WEBBING ANCHORAGE FOR SEAT BELT SYSTEM

[75] Inventors: Satoshi Hirase; Osamu Tokugawa; Kazunori Takahashi, all of Kanagawa, Japan

[73] Assignee: NSK, Ltd., Japan

[21] Appl. No.: 455,145

[22] Filed: May 31, 1995

[30] Foreign Application Priority Data

Jun. 3, 1994 [JP] Japan .................................. 6-122697

[51] Int. Cl.⁶ .................................................. B60R 22/00
[52] U.S. Cl. ...................... 280/801.1; 280/808; 297/486
[58] Field of Search ................................. 280/801.1, 808, 280/804, 801.2; 297/468, 486, 483

[56] References Cited

U.S. PATENT DOCUMENTS 5,529,344  6/1996  Yasui et al. .

FOREIGN PATENT DOCUMENTS 60-122261  8/1985  Japan .
1-25723    8/1989  Japan .

Primary Examiner—Eric D. Culbreth
Attorney, Agent, or Firm—Evenson, McKeown, Edwards & Lenaham P.L.L.C.

[57] ABSTRACT

A webbing anchorage is provided for use in a seat belt system. The webbing anchorage comprises a bolt; an anchor metal plate having a base portion and a free end portion, said base portion defining a bolt hole through which said bolt is inserted, and said free end portion defining a slot through which a webbing can extend supportedly; a lower cover extending over one side of said base portion of said anchor metal plate; a flexible upper cover member extending over at least an opposite side of the said base portion of said anchor metal plate; and an impact-absorbing member arranged within a space between an inner wall of said upper cover member and at least one of said opposite side of said base portion of said anchor metal plate and a top wall of a head portion of said bolt.

12 Claims, 14 Drawing Sheets

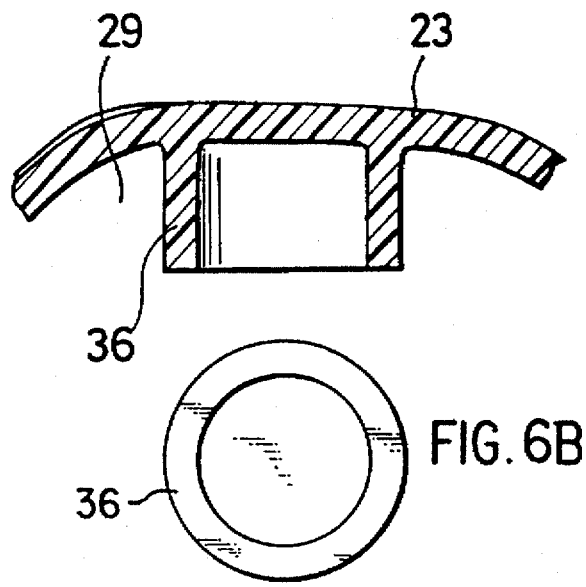
FIG. 6A
FIG. 6B
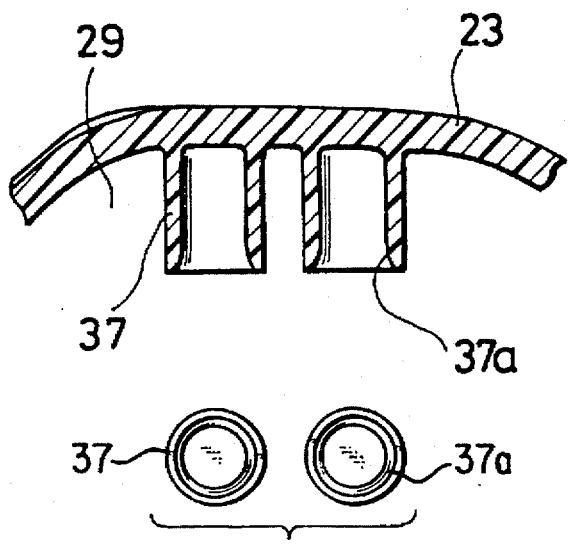
FIG. 7A
FIG. 7B 5,685,566

WEBBING ANCHORAGE FOR SEAT BELT SYSTEM

BACKGROUND OF THE INVENTION a) Field of the Invention

This invention relates to a webbing anchorage for a seat belt system which is arranged in an automotive vehicle for the protection of an occupant. This webbing anchorage is useful for supporting a webbing, one of elements of the seat belt system, on a vehicle body.

b) Description of the Related Art

A seat belt system serves to support an occupant's body by a webbing (i.e., a belt-shaped member generally called a "seat belt") so that in the event of a collision accident or the like, the occupant's body can be protected from colliding against a steering wheel, an instrument panel or the like, in other words, a secondary collision can be avoided. The webbing of the seat belt system is supported on a vehicle body, for example, by holding its lower end portion with a lap anchor and its intermediate portion with a through-anchor. In the case of an ordinary 4-door sedan, for example, the lap anchor is arranged on an inner side wall of a lower end portion of a B-pillar generally called a "center pillar" and located in a middle section of a side wall of the vehicle body, whereby a low end portion of the webbing is fastened to and supported on the vehicle body. On the other hand, the through-anchor is disposed on an inner side wall of an upper portion of the B-pillar and supports the webbing, which has been pulled out of the B-pillar or the like, in a deflected form at an intermediate part thereof.

Conventionally-known webbing anchorages for supporting such a webbing on a vehicle body include, for example, those disclosed in Japanese Utility Model Application Laid-Open (Kokai) No. SHO 60-122261, Japanese Utility Model Publication (Kokoku) Nos. SHO 53-26752 and HEI 1-25723, etc. Among these, a first example of such conventional constructions, said first example being disclosed in Japanese Utility Model Application Laid-Open (Kokai) No. SHO 60-122261, is shown in FIGS. 12 through 14. A description will first be made of the construction of the first example.

A through-anchor 2 is arranged on an inner side wall of an upper portion of a B-pillar 1. A webbing 4 is extends through an anchor ring 3 secured on the through-anchor 2, whereby the webbing 4 is supported at an intermediate part thereof. In addition to the above-described anchor ring 3, this through-anchor 2 is also provided with an anchor fitting 5, a bolt 6 and a cover 7. Of these, The anchor fitting 5, with the anchor ring 3 supported thereon, is supported by the bolt 6 on an inner side wall of an upper portion of the B-pillar 1. The cover 7 is made of a synthetic resin and prevents exposure of essential elements such as the anchor fitting 5 and the bolt 6 in an interior of the vehicle, so that the area where the through-anchor 2 is arranged has been decently finished. Although the anchor fitting 5 is fixed on the B-pillar 1 in the example illustrated in the drawing, through-anchors equipped with a so-called height-adjustable shoulder anchor mechanism which supports the anchor fitting 5 adjustably in height relative to the B-pillar 1 are also known for many years.

Next, FIGS. 15 and 16 depict, as a second example of the conventional constructions, the construction disclosed in Japanese Utility Model Publication (Kokoku) No. SHO 53-26752. In the case of this construction, a slot 8 is formed in a free end portion (a lower end portion as viewed in FIG. 16) of an anchor metal plate 5a. An end portion of a webbing 4 extends through the slot 8 so that the end portion of the webbing 4 is fastened to and supported on the anchor metal plate 5a. Except for the area of the slot 8 and the area of a circular hole 9 through which the bolt 6 is inserted, the anchor metal plate 5a is covered by a pad 10 which has impact-absorbing property. The anchor metal plate 5a is mounted is therefore decently finished. Even when the head of an occupant is caused by a side collision or the like to impact the area where the anchor metal plate 5a is arranged, the pad 10 can absorb the impact energy so that the occupant's head is protected from a serious injury.

The conventional webbing anchorages for seat belt systems, said webbing anchorages being constructed as described above, are however accompanied by problems to be overcome as will be described next.

First, in the case of the construction of the first example shown in FIGS. 12 through 14, the energy of an impact which is produced when the occupant's head is caused to impact the cover 7 as a result of a side collision cannot be absorbed. There is hence the potential danger that the occupant's head may receive a serious injury. The cover 7 made of the synthetic resin may undergo some deformation so that the impact may be absorbed. If the cover 7 is broken or is deformed significantly, however, the occupant's head may impact the anchor fitting 5 and/or the bolt 6, thereby posing the potential danger that the occupant's head may be seriously injured.

In the case of the construction of the second example illustrated in FIGS. 15 and 16, the above-described potential danger of receiving a serious injury can be reduced but the artistic design tolerance of the interior of an automobile vehicle is considered to become smaller. Namely, the color is generally coordinated in the interior of an automotive vehicle in relation to the colors of seats, an instrument panel and the like. To make less noticeable the webbing anchorage arranged on the inner side wall of the upper portion of the B-pillar 1, it is preferred to make the color of the webbing anchorage the same as that of the surface of the B-pillar 1. It may however be difficult to coordinate their colors in the construction of the second example depicted in FIGS. 15 and 16, because the impact-absorbing pad 10 itself is exposed to the surface.

Namely, a surface layer covering the surface of the B-pillar 1 and the pad 10 are each made of a synthetic resin. More specifically, different synthetic resins are used for them. There is accordingly the possibility of developing such a problem that the appearance around the pad 10 may become poor, because it may be difficult to make the color of the pad 10 the same as that of the surface layer or the degrees of fading of the pad 10 and the surface layer after passage of a long time may differ substantially due to their differences in weatherability and light fastness. Where priority is given to the interior appearance, it may therefore become impossible to choose a synthetic resin of best impact absorbing property as a material for the pad 10. Further, due to the influence of ultraviolet rays, the impact absorbing property of the pad 10 may be deteriorated after passage of a long period.

SUMMARY OF THE INVENTION

An object of the present invention is to provide a webbing anchorage for a seat belt system, which can eliminate or reduce the above-described problems.

In one aspect of the present invention, there is thus provided a webbing anchorage for a seat belt system, comprising:

a bolt;

an anchor metal plate having a base portion and a free end portion, said base portion defining a bolt hole through which said bolt is inserted, and said free end portion defining a slot through which a webbing can extend supportedly;

a lower cover extending over one side of said base portion of said anchor metal plate;

a flexible upper cover member extending over at least an opposite side of the said base portion of said anchor metal plate; and an impact-absorbing member arranged within a space between an inner wall of said upper cover member and at least one of said opposite side of said base portion of said anchor metal plate and a top wall of a head portion of said bolt.

In the webbing anchorage according to the present invention, its surface is covered by the flexible upper cover member. Since it is unnecessary to impart impact-absorbing property to the upper cover member itself, the surface color and texture can be chosen freely. When the head of an occupant is caused to impact the surface of the upper cover member as a result of a side collision, the upper cover member is deformed so that the upper cover member is crushed. The impact-absorbing member arranged within the space between the inner wall of the upper cover member and at least one of the opposite side of the base portion of the anchor metal plate and the top wall of the head portion of the bolt is crushed. When the impact-absorbing member collapses in this manner, the impact-absorbing member absorbs impact energy produced by the impact so that the danger of a serious injury of the occupant's head as a result of the impact against the upper cover member can be reduced.

BRIEF DESCRIPTION OF THE DRAWINGS

FIG. 6A illustrates on an enlarged scale a cross-sectional viewing a rib in a webbing anchorage according to a fifth embodiment of the present invention;

FIG. 6B is a bottom view of the rib of FIG. 6A;

FIG. 7A depicts on an enlarged scale a cross-sectional view of a rib in a webbing anchorage according to a sixth embodiment of the present invention;

FIG. 7B is a bottom view of the rib of FIG. 7A;

DETAILED DESCRIPTION OF THE INVENTION AND PREFERRED EMBODIMENTS

Figure 1:
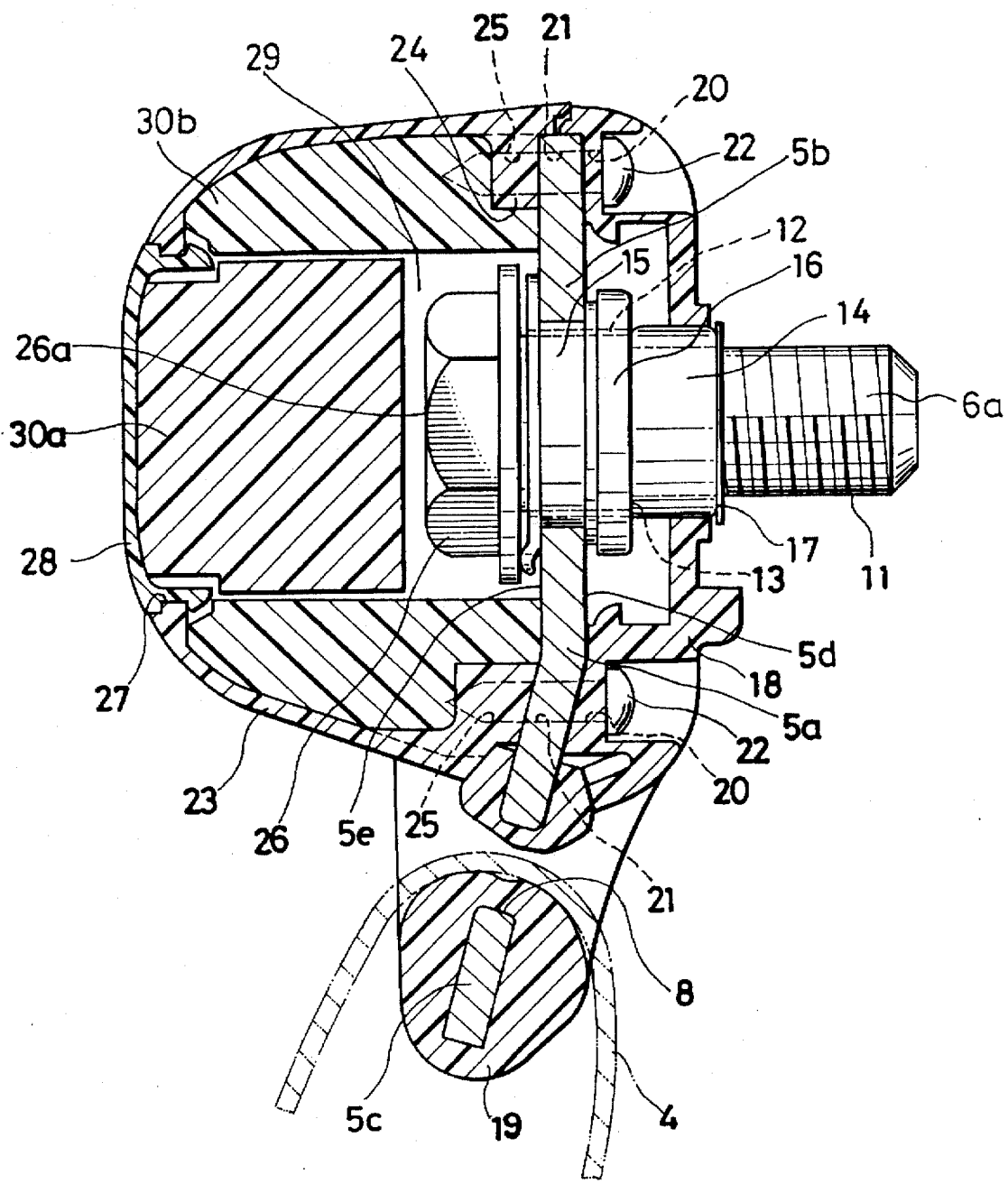
FIG. 1 is a cross-sectional view of a webbing anchorage according to a first embodiment of the present invention, taken in the direction of arrows I—I in FIG. 2.
Figure 2:
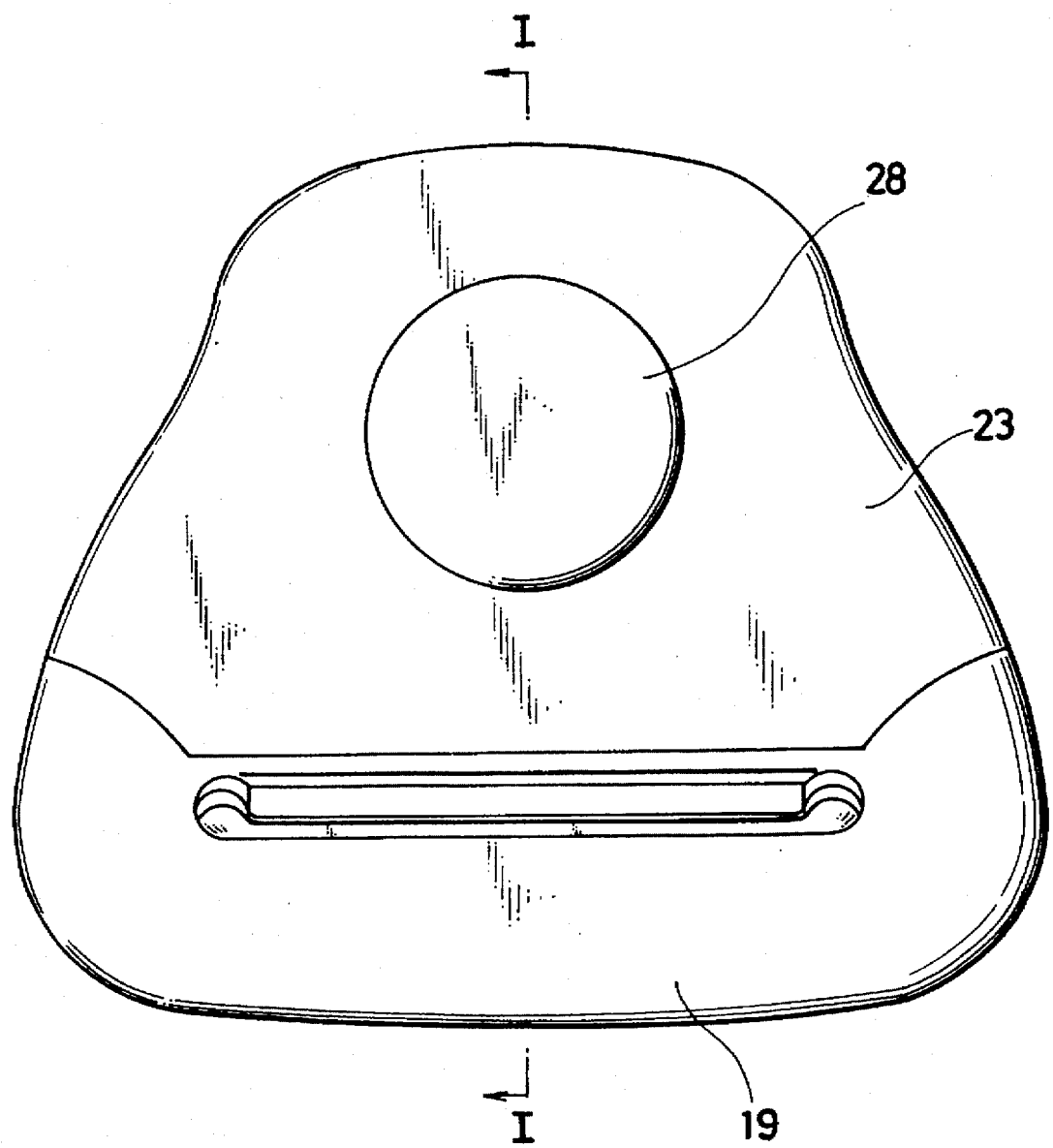
FIG. 2 is a side view of the webbing anchorage according to the first embodiment of the present invention as viewed from a left-hand side of FIG. 1.

FIGS. 1 and 2 illustrate the first embodiment of the present invention. In FIG. 1, an anchor metal plate 5a, which has been formed by pressing a metal plate having sufficient rigidity such as a steel plate or the like, has a base portion 5b and a free end portion 5c. A bolt hole is formed through the base portion 5b. By a bolt 6a, the base portion 5b is supported on an inner side wall of a vehicle body, for example, on an inner side wall of an upper portion of a B-pillar (see FIGS. 12, 13, 14 and 16). Employed as the bolt 6a in the first embodiment is a bolt having a small-diameter portion 11 and a large-diameter portion 12 connected continuously via a stepped portion 13. Upon mounting the anchor metal plate 5a on the inner side wall of the B-pillar 1, a collar 14 fitted on the small-diameter portion 11 is held between the inner side wall of the B-pillar 1 and the stepped portion 13.

Rotatably fitted on the large-diameter portion 12 are a washer 15 made of a resilient material and a spacer 16. The anchor metal plate 5a is externally fitted on the washer 15. Designated at numeral 17 is a slip-off preventing member which is called a "fiber washer" and is externally fitted on a threaded portion of the bolt 6a. This slip-off member 17 prevents the above individual members 14–16, which are fitted on the bolt 6a, from slipping off the bolt 6a. Owing to the provision of the slip-off member 17, these members 6a,14–16 and the anchor metal plate 5a can be handled all together as an integral unit.

A covering 19 made of a synthetic resin is applied around a slot 8 which is formed through the free end portion 5c of the anchor metal plate 5a so that the radius of curvature of a lower edge portion of the slot 8 is provided with a large curvature of radius. Therefore, a portion of the webbing 4 inserted in the slot 8 is prevented from being folded at a smaller radius of curvature. As a result, the webbing 4 is protected from damage even when large impact force is applied in a pulling direction to the webbing 4 upon occurrence of a collision accident.

On an outer peripheral surface of the collar 14, a lower cover 18 made of a synthetic resin is externally fitted. Self-tapping screws 22,22, which extend through small circular holes 20,20 formed through the lower cover 18 and small circular holes 21,21 formed through the anchor metal plate 5a, are in threaded engagement with small circular holes 25,25 formed through a connecting flange 24 which is disposed on a base portion of an upper cover 23. The self-tapping screws 22,22 therefore firmly fasten the lower cover 18, the anchor metal plate 5a and the upper cover 23 together. Based on these threaded engagement and firm fastening, the lower cover 18 extends over the one side 5d of the anchor metal plate 5a and the upper cover 23 covers at least the opposite side 5e of the base portion 5b of the anchor metal plate 5a.

The upper cover 23 is made of a synthetic resin such as polypropylene and, to impart sufficient flexibility, is formed relatively thin. An opening 27 is formed in the upper cover 23 at a central portion thereof which is located opposite a head portion 26 of the bolt 6a. This opening 27 is closed by a detachable cover member 28 made of the same material as the upper cover 23. A space 29 is defined between an inner wall of the upper cover 23 and the opposite side 5e of the base portion 5b of the anchor metal plate 5a and also between an inner wall of the cover member 28 and a top wall 26a of the head portion 26 of the bolt 6a.

To arrange cushioning means within the space 29, cushioning members 30a,30b are supported and fixed as an impact-absorbing member on an inner peripheral wall of the upper cover 23 and an inner wall of the cover member 28. These cushioning members 30a,30b are made of a material having impact-absorbing property, such as foamed polystyrene resin or foamed polyurethane resin, and occupy a volume as large as possible in the space 29.

In the case of the above-constructed webbing anchorage according to the first embodiment of the present invention, the opposite side 5e of the base portion 5b of the anchor metal plate 5a is covered by the upper cover 23 made of the synthetic resin. It is unnecessary to impart impact-absorbing property to the upper cover 23 itself. This enables to make the surface of the upper cover 23 and the surface of the B-pillar 1 the same in color and texture, for example, by forming the upper cover 23 with the same material as the surface layer of the B-pillar 1. Limitations in appearance or design are accordingly reduced or eliminated.

If the occupant's head is caused to impact the surface of the upper cover 23 as a result of a side collision, the upper cover 23 is deformed so that the upper cover 23 is crushed. As a consequence, the cushioning members 30a,30b arranged within the space 29 between the inner wall of the upper cover 23 and the opposite side 5e of the base portion 5b of the anchor metal plate 5a and also between the inner wall of the cover member 28 and the top wall 26a of the head portion 26 of the bolt 6a are caused to collapse. Since the impact energy produced as a result of the collision is absorbed upon collapse of the cushioning members 30a,30b, the potential danger that the occupant's head portion impacted the upper cover 23 may be injured can be reduced.

The cushioning members 30a,30b are both covered by the upper cover 23 and the cover member 28 and are not exposed to the interior of an automotive vehicle. It is therefore possible to adopt those showing the maximum impact absorption effects without the need for considering the color, weatherability, light fastness of the like of the surface. Therefore, the head injury preventing effect at the time of a side collision can be brought about to a maximum extent. Since the impact member 30a,30b are not exposed to the sun light, these cushioning members are free from ultraviolet deterioration.

In the embodiments to be described hereinafter, like elements of structure as the corresponding elements in the first embodiment will be identified by like reference numerals and their description will be omitted herein.

Figure 3A:
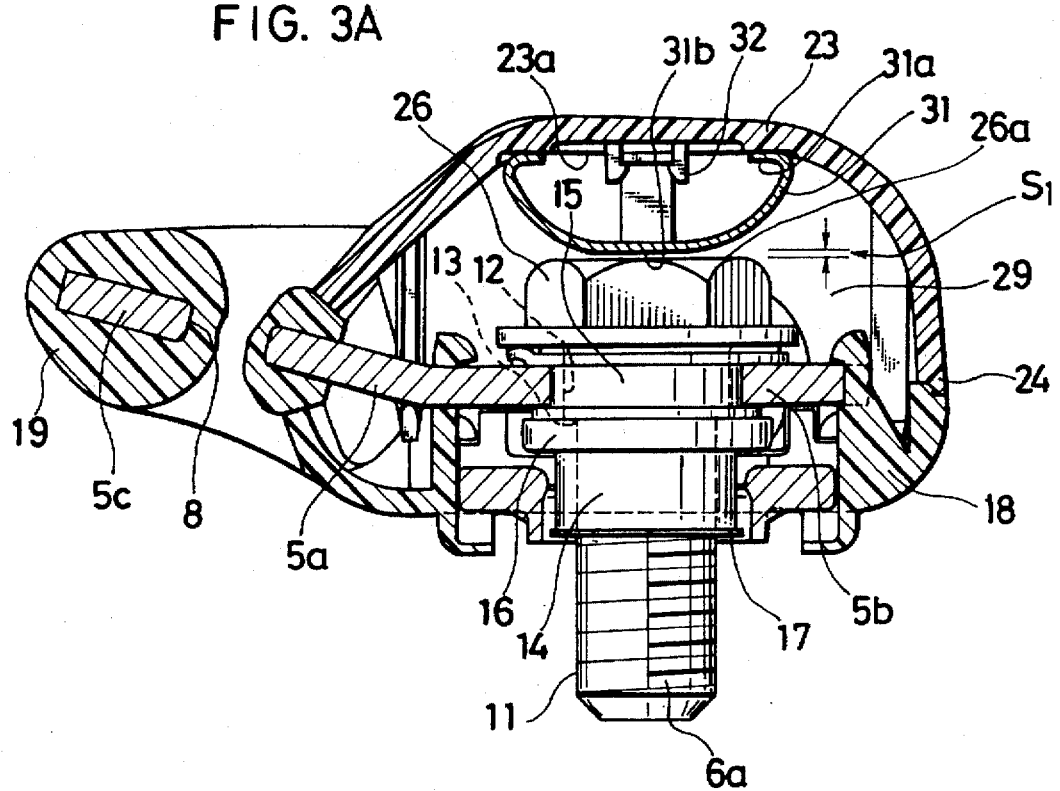
FIG. 3A is a cross-sectional view similar to FIG. 1 but illustrates a webbing anchorage according to a second embodiment of the present invention.
Figure 3B:
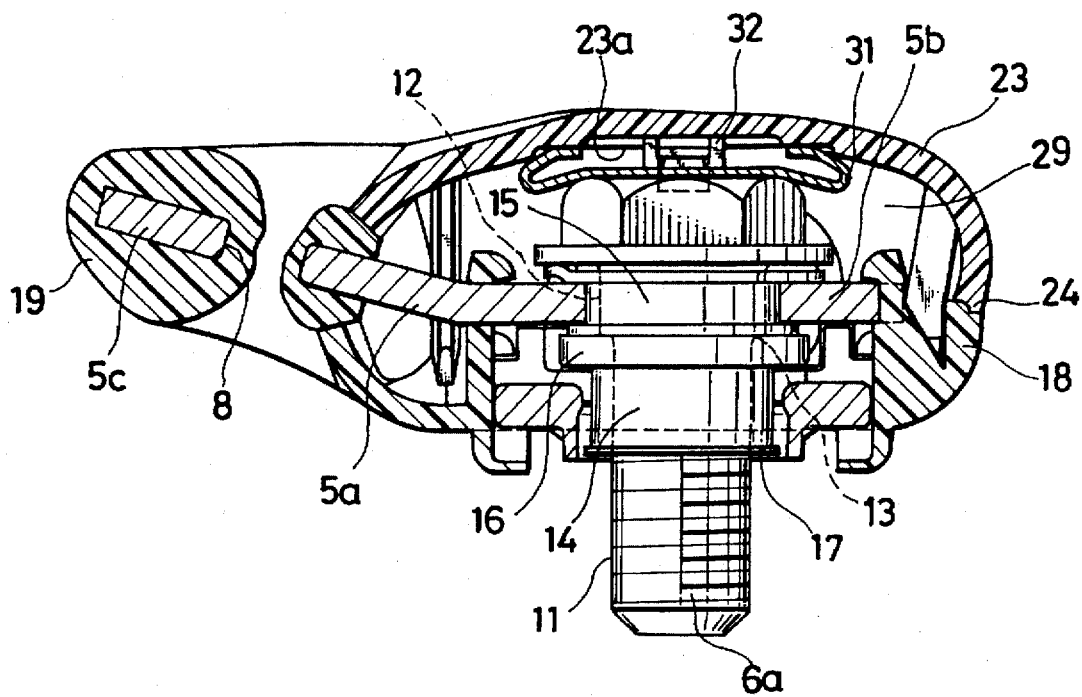
FIG. 3B is a cross-sectional view similar to FIG. 3A but shows the webbing anchorage according to the second embodiment of the present invention after absorption of an impact.
Figure 3C:
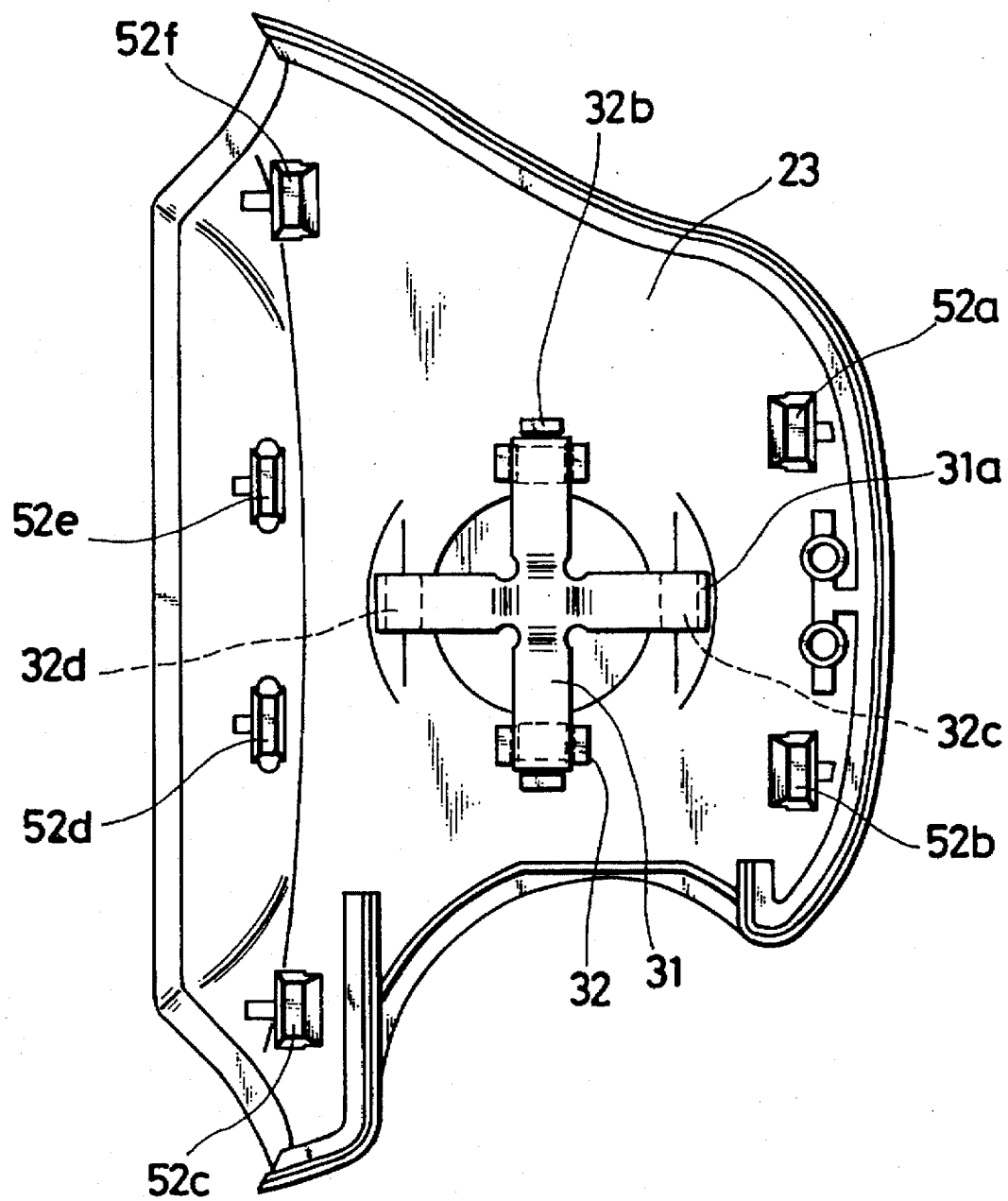
FIG. 3C is a bottom view of the upper cover member in the webbing anchorage of FIG. 3A and illustrates an inner wall of the upper cover member.

FIGS. 3A through 3C illustrate the second embodiment of the present invention. The second embodiment has, as an impact-absorbing member, a sheet metal member 31 which is formed in a substantially cruciform and is fixed on an inner wall 23a of an upper cover 23 so that the sheet metal member 31 extends toward the top wall 26a of the head portion 26 of the bolt 6a. The sheet metal member 31 is preferably formed of collapsible aluminum or the like.

Individual end portions 31a of the sheet metal member 31 are bent inwardly. The end portions 31a are held by their corresponding hooks 32 formed on the inner wall 23a of the upper cover with a small space S1 left between a center portion 31b of the sheet metal member 31 and the head portion 26 of the bolt 6a.

Even when the occupant's head or the like is caused to impact the area of arrangement of the anchor metal plate 5a upon a collision accident or the like, the sheet metal member 31 undergoes a deformation in a direction toward the head portion 26 to absorb the energy of the collision as shown in FIG. 3B.

The degree of this deformation can be adjusted by choosing a desired material for the sheet metal member 31, changing the diameter of the fixing positions, or changing the shape of the sheet metal member 31 substantially into a cruciform or into the form of an octacle.

Figure 4A:
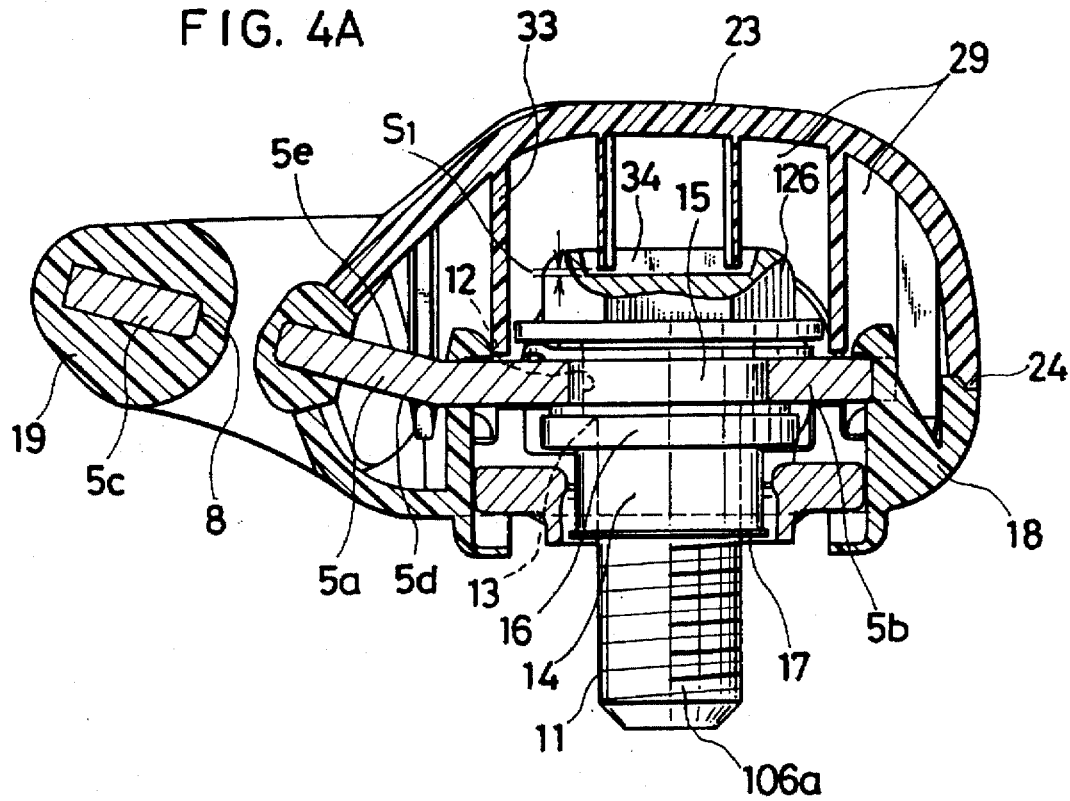
FIG. 4A is a cross-sectional view similar to FIG. 1 but depicts a webbing anchorage according to a third embodiment of the present invention.
Figure 4B:
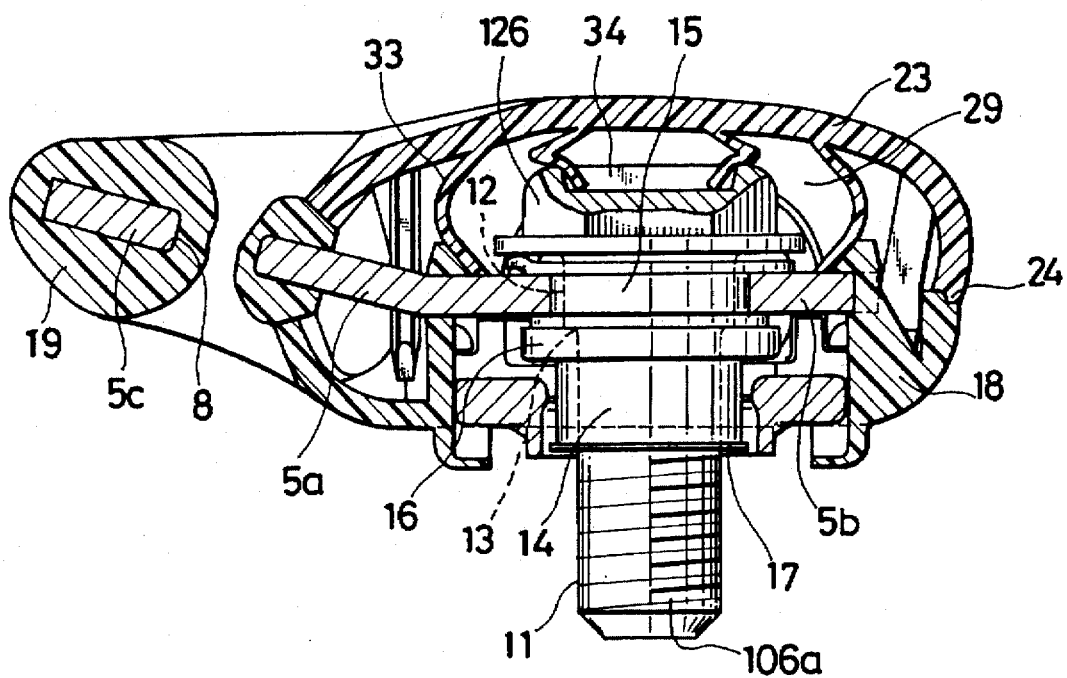
FIG. 4B is a cross-sectional view similar to FIG. 4A but shows the webbing anchorage according to the third embodiment of the present invention after absorption of an impact.
Figure 4C:
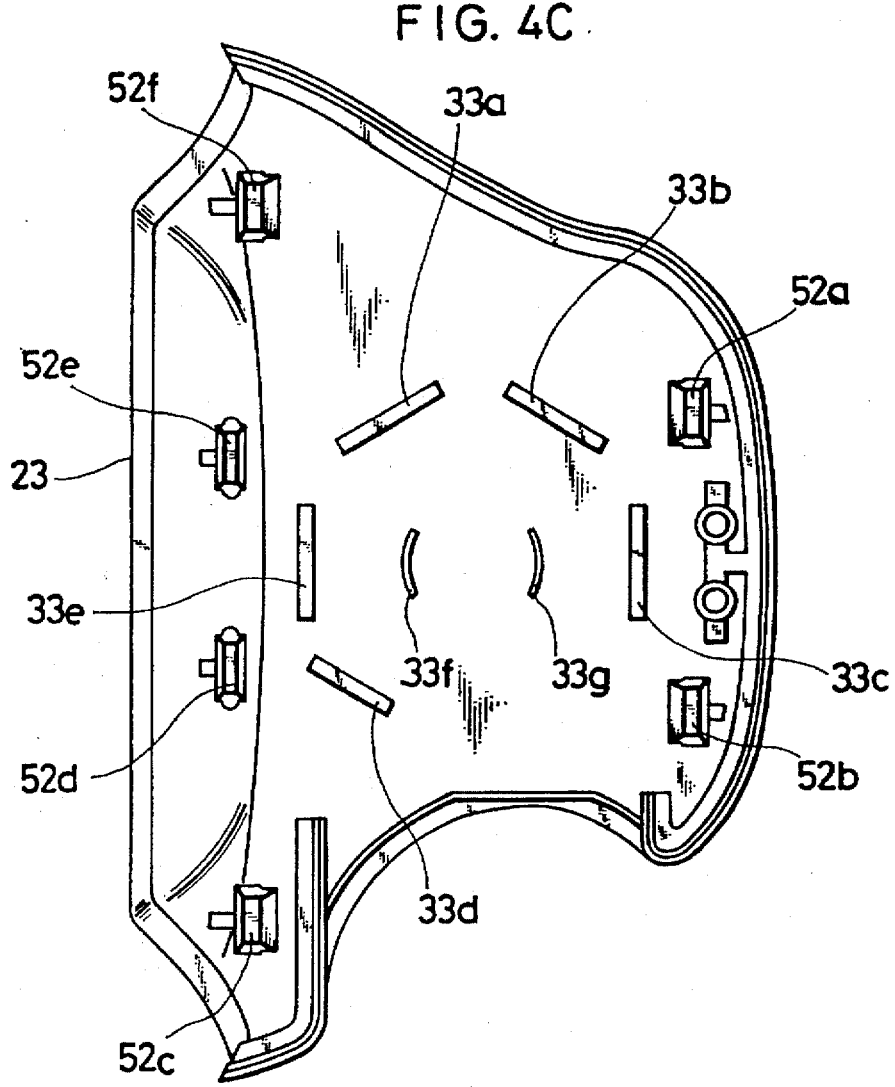
FIG. 4C is a bottom view of the upper cover member in the webbing anchorage of FIG. 4A and illustrates an inner wall of the upper cover member.

FIGS. 4A through 4C depict the third embodiment of the present invention.

Extending from the inner wall 23a of the upper cover 23, there are independently formed first ribs 33f,33g toward a head portion 126 of a bolt 106a and second ribs 33a,33b, 33c,33d,33e toward the opposite side 5e of the base portion 5b of the anchor metal plate 5a. Each of these ribs has a length shorter by the space (S1) than the height of the space 29. These ribs 33a,33b,33c,33d,33e,33f,33g serve as impact-absorbing members and are formed integrally with the upper cover 23.

Formed in the head portion 126 of the bolt 106a, on the other hand is a recess 34 into which the first ribs 33f,33g can be inserted.

When the occupant's head impacts the surface of the upper cover 23 as a result of a side collision, the ribs 33a–33g collapse or undergo compressive deformations shown in FIG. 4B after the ribs 33a–33g are brought into contact with the opposite side 5e of the base portion 5b of the anchor metal plate 5a or a bottom wall of the recess 34. The energy of impact by the collision is absorbed, whereby the degree of an injury of the occupant's head is reduced.

FIGS. 5 through 7 illustrate the fourth to sixth embodiments of the present invention, respectively.

Figure 5A:
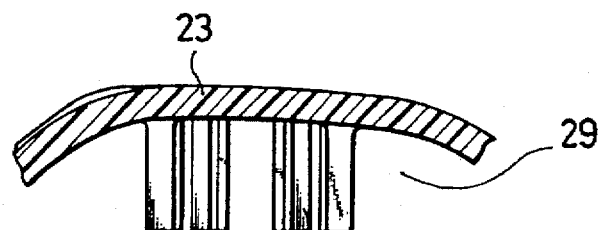
FIG. 5A shows on an enlarged scale a cross-sectional view of a rib in a webbing anchorage according to a fourth embodiment of the present invention.
Figure 5B:
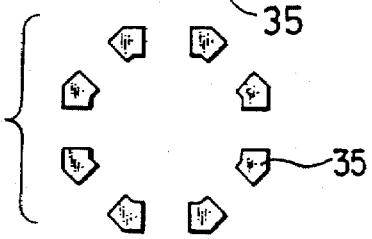
FIG. 5B is a bottom view of the rib of FIG. 5A.

In the fourth embodiment shown in FIGS. 5A and 5B, a rib 35 is formed of independent rib sections having a substantially square cross-section. These rib sections are arranged along a circle. The rib 35 so formed has an outer diameter which like the third embodiment, permits insertion of the rib sections into the recess 34 of the head portion 126 of the bolt. The rib sections are disposed symmetrically with respect to a straight line passing on and along a central axis of the bolt as viewed in a cross-sectional plane extending through the rib in a direction perpendicular to the straight line. Even if the area of collision of the occupant's head by a side collision is deviated from the axis of the bolt, the energy of the impact by the collision can be absorbed.

In the fifth embodiment depicted in FIGS. 6A and 6B, a rib 36 has a cylindrical shape which has an outer diameter permitting insertion of the rib 36 into the recess 34 of the head portion 126 of the bolt. Even if the direction of impact of the occupant's head by a side collision has an angle with respect to the direction of the axis of the bolt, the rib does not fall or break owing to its cylindrical shape. Accordingly, even if the direction of impact is deviated from the direction of the axis of the bolt, absorption of the resulting impact energy can be achieved surely.

In the sixth embodiment illustrated in FIGS. 7A and 7B, ribs 37 are cylindrical as in the fifth embodiment. The outer diameter of each cylindrical rib 37 is smaller than the rib in the fifth embodiment but two cylindrical ribs 37 are arranged. The inner diameter of a free end portion 37a of each cylindrical rib 37 increases toward a free end of the cylindrical rib 37 so that the wall of the free end portion of the cylindrical rib 37 becomes smaller in cross-section toward the free end of the cylindrical rib 37. When an impact is applied from an outer side of the upper cover 23, the free end portion 37a of each cylindrical rib 37 is first flared radially so that the free end portion 37a is brought in the flared shape into contact with the head portion 126 of the bolt or the opposite side 53 of the base portion 5b of the anchor metal plate 5a. Each cylindrical rib 37 can therefore remain upright without falling or breaking at a base portion thereof. Upon subsequent application of a further impact, the ribs 37 undergo collapse or compressive deformation like the other embodiments so that the resulting impact energy is absorbed. Since the ribs 37 are stably held in their upright positions, the energy of an impact can be absorbed surely as in the fifth embodiment even if the impact takes place with an angle relative to the axis of the bolt.

Figure 8:
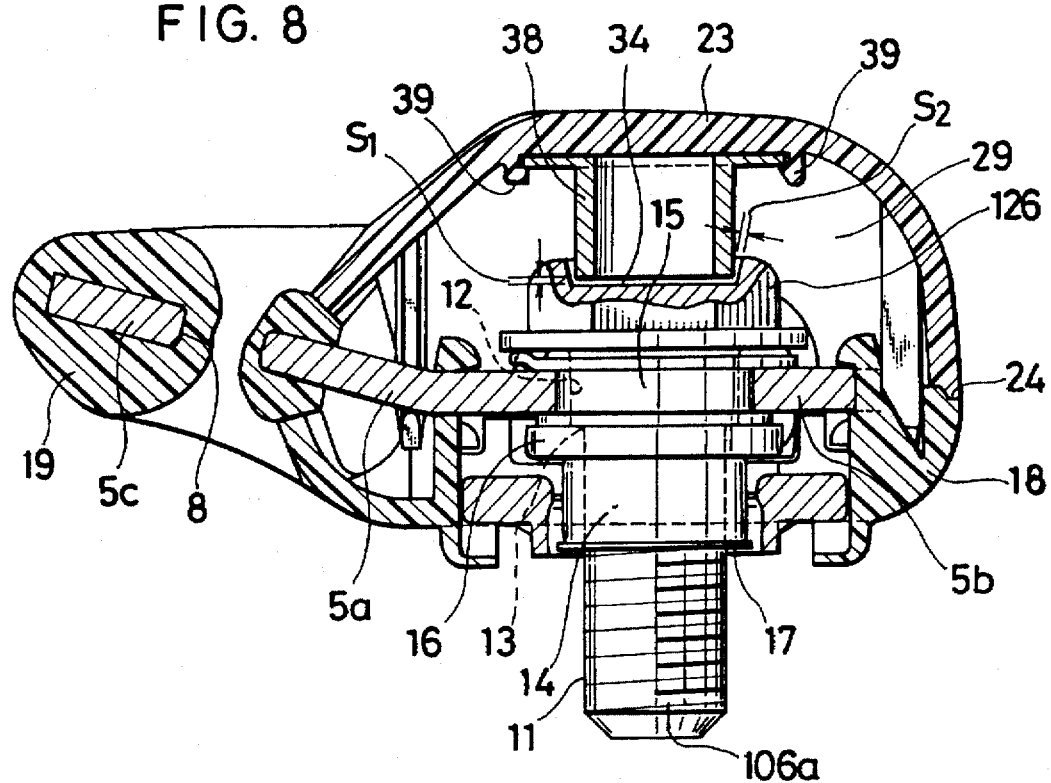
FIG. 8 is a cross-sectional view similar to FIG. 1 but illustrates a webbing anchorage according to a seventh embodiment of the present invention.

The seventh embodiment is shown in FIG. 8. The ribs described above with respect to the third to sixth embodiments are replaced by a flanged cylindrical rib 38 which is discrete from the upper cover 23. The mechanism of action in which the flanged cylindrical rib 38 is deformed by an impact from the outer side of the upper cover 23 and absorbs the resulting impact energy is similar to that described above in connection with the third to sixth embodiments. The discrete formation of the flanged cylindrical rib 38 from the upper cover 23 makes it possible to use various materials different from the material of the upper cover 23. The absorbability of energy when an impact is applied from the outer side of the upper cover 23 can therefore be adjusted.

Figure 9:
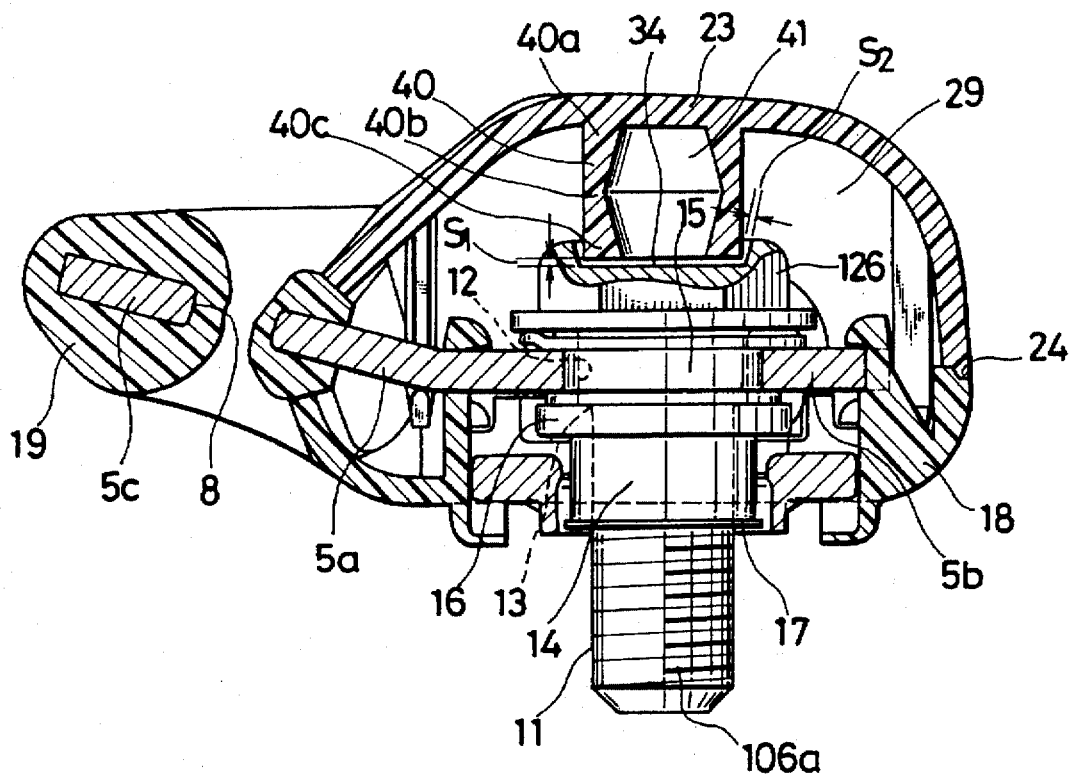
FIG. 9 is a cross-sectional view similar to FIG. 1 but illustrates a webbing anchorage according to an eighth embodiment of the present invention.

In the eighth embodiment shown in FIG. 9, a rib 40 is cylindrical and is substantially similar to the rib in the fifth embodiment. An intermediate portion 40b of the rib 40 has a different, namely, smaller thickness than a base portion 40a and free end portion 40c of the rib 40. A cavity 41 of the cylinder is in the form of a barrel. Since the thickness of the intermediate portion 40b is smaller than those of the base portion 40a and free end portion 40c, the rib 40 is first radially and outwardly bent at the intermediate portion 40b. Depending on the shape of a rib, the manner of its deformation (collapse, compressive deformation, . . . . ) and the position and direction of its deformation are considered to vary depending on the angle and position of a contact of the occupant's head to the upper cover 23 by a side collision. In such a case, there is the potential problem that the absorption of the resulting impact may vary considerably. In the case of a cylindrical rib, it is considered that a deformed portion of the cylinder may fill up the space inside the cylinder and a deformation stroke cannot be achieved to an extent sufficient to absorb the resulting impact. By forming the cavity 41 into a barrel shape to make the wall thickness of the cylinder smaller only at the intermediate portion 40b so that a stress concentrated portion is furnished, the manner, position and direction of deformation of the rib 40 can be set in advance, thereby making it possible to solve the above-described problems.

Figure 10A:
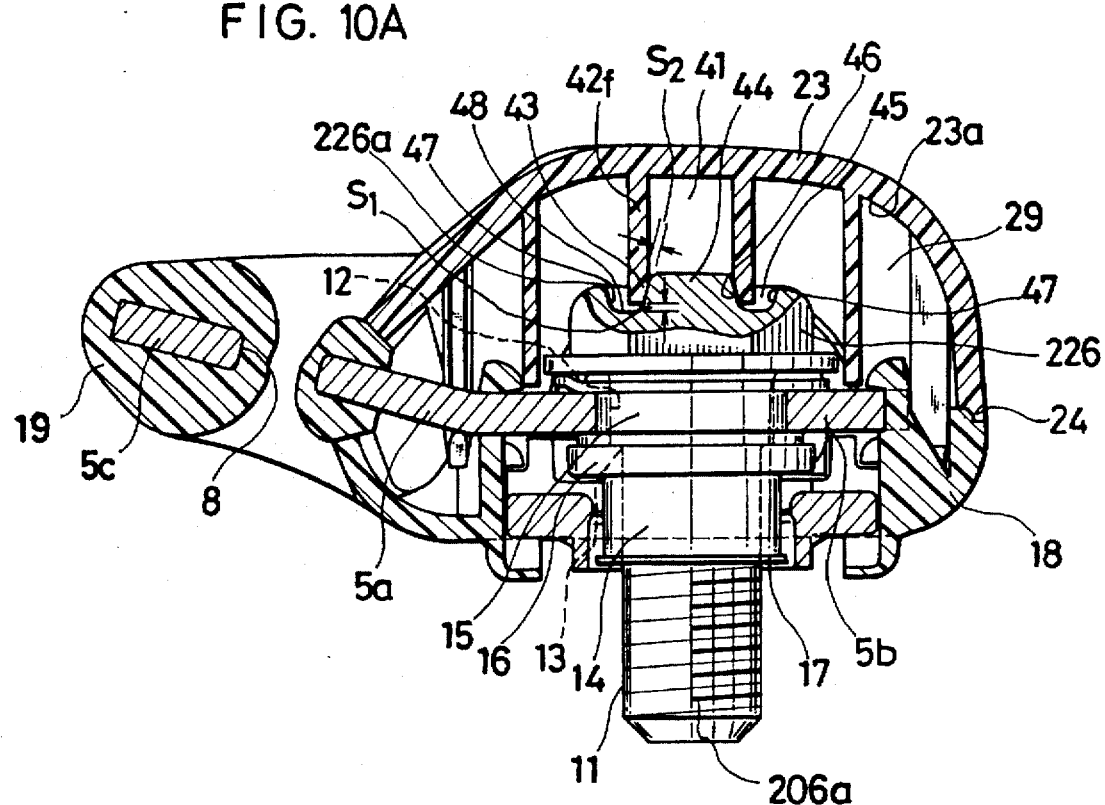
FIG. 10A is a cross-sectional view similar to FIG. 1 but illustrates a webbing anchorage according to a ninth embodiment of the present invention.
Figure 10B:
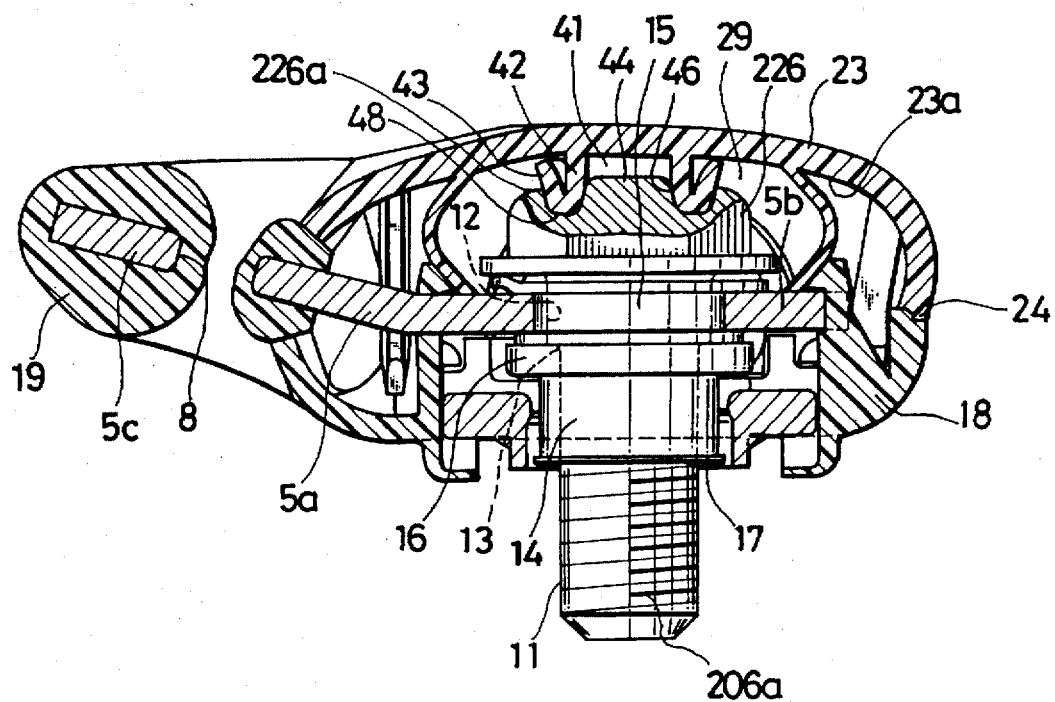
FIG. 10B is a cross-sectional view similar to FIG. 10A but shows the webbing anchorage according to the ninth embodiment of the present invention after absorption of an impact.
Figure 10C:
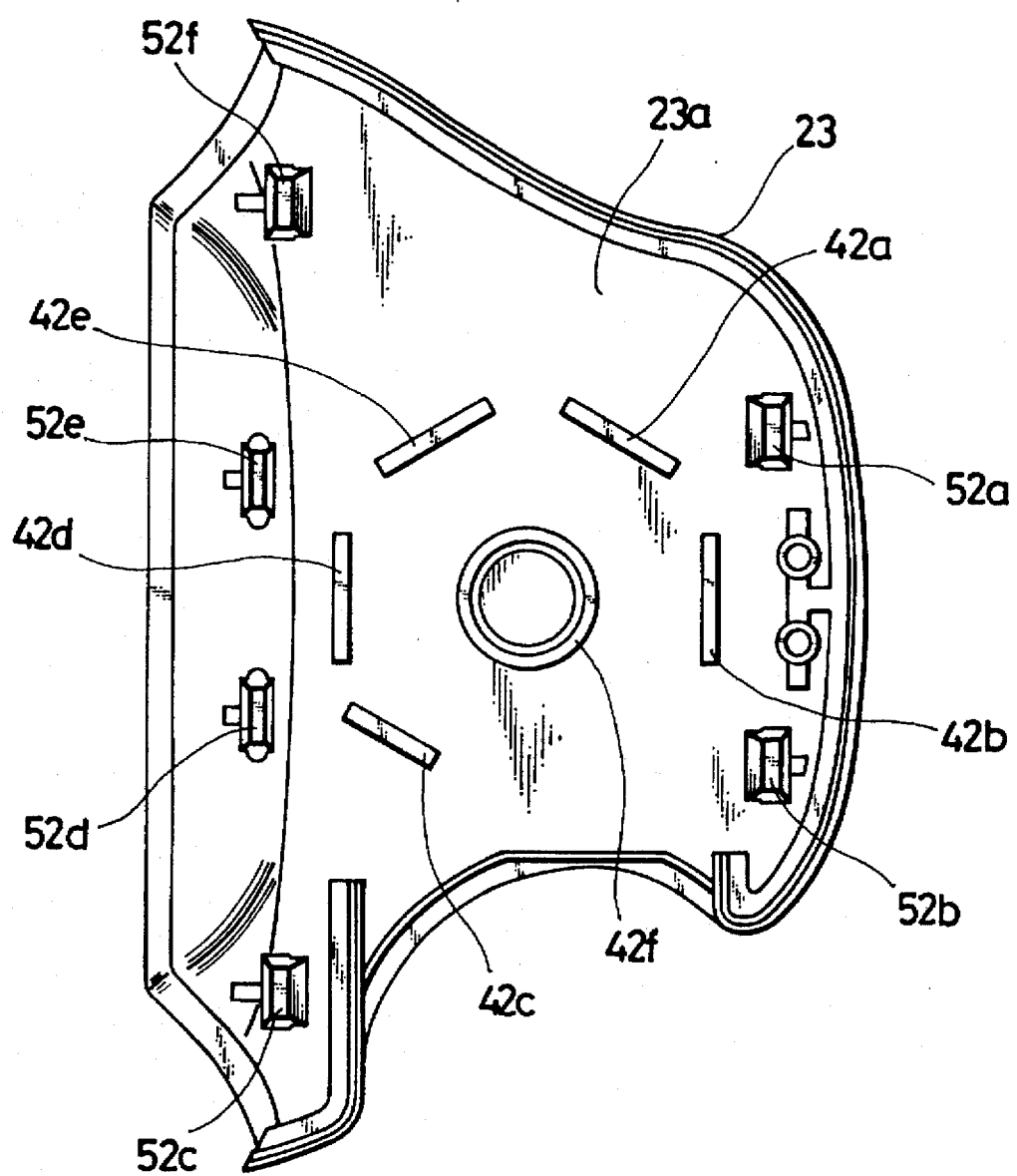
FIG. 10C is a bottom view of the upper cover member in the webbing anchorage of FIG. 10A and illustrates an inner wall of the upper cover member.

FIGS. 10A through 10C illustrates the ninth embodiment of the present invention. A head portion 226 of a bolt 206a is provided in a top wall 226a thereof with a recess 46 which is in the form of a ring-shaped groove. Extending from the inner wall 23a of the upper cover 23, there are independently formed a first rib 42f toward the recess 45 in the head portion 226 of the bolt 206a and second ribs 42a,42b,42c,42d,42e toward the opposite side 5e of the base portion 5b of the anchor metal plate 5a. Each of these ribs has a length shorter by the space (S1) than the height of the space 29. These ribs 42a,42b,42c,42d,42e,42f,42g are formed integrally with the upper cover 23. The first rib 42f has a cylindrical shape like the fifth embodiment. The inner diameter of a tapered free end portion 43 of the first rib 42f increases toward a free end thereof so that the wall of the free end portion 43 of the first rib 42f becomes smaller in cross-section toward the free end of the first rib 42f. At a part surrounded by the recess 45 which is located opposite the cylindrical rib 42f, a land 44 is formed. This land 44 is fitted in an inner peripheral wall of the free end portion 43 of the cylindrical rib 42f with a space S2 maintained therebetween. The land 44 has a complementary tapered portion 46 with the tapered free end portion 43 of the rib 42f. These tapered portions 43,46 improve the assembling efficiency upon assembling the upper cover 23 and facilitate the radial and outward flaring of the free end portion of the rib 42f when an impact is applied from the outer side of the upper cover 23. The recess 45 of the bolt 206a is connected to the top wall 226a of the head portion 226 via a slope 47. In other words, an outer wall of the recess or ring-shaped groove 45 is sloped so that an outer diameter of the ring-shaped groove increases toward an outer peripheral edge of the outer wall of the ring-shaped groove. When the free end portion 43 flared outwardly by an impact from the outer side of the upper cover 23 is pressed further toward the bolt 206a, the free end portion 43 rises backward on and along the slope 47 and is hence turned back. As is understood from the foregoing, the rib 42f is supported at the free end thereof over the entire periphery thereof in the present embodiment. Even if the direction of an impact of the occupant's head due to a lateral collision is deviated at an angle from the direction of the axis of the bolt or is deviated from the axis of the bolt, the rib is not caused to fall or break at a base portion thereof, whereby the resulting impact energy can be absorbed surely.

Figure 11:
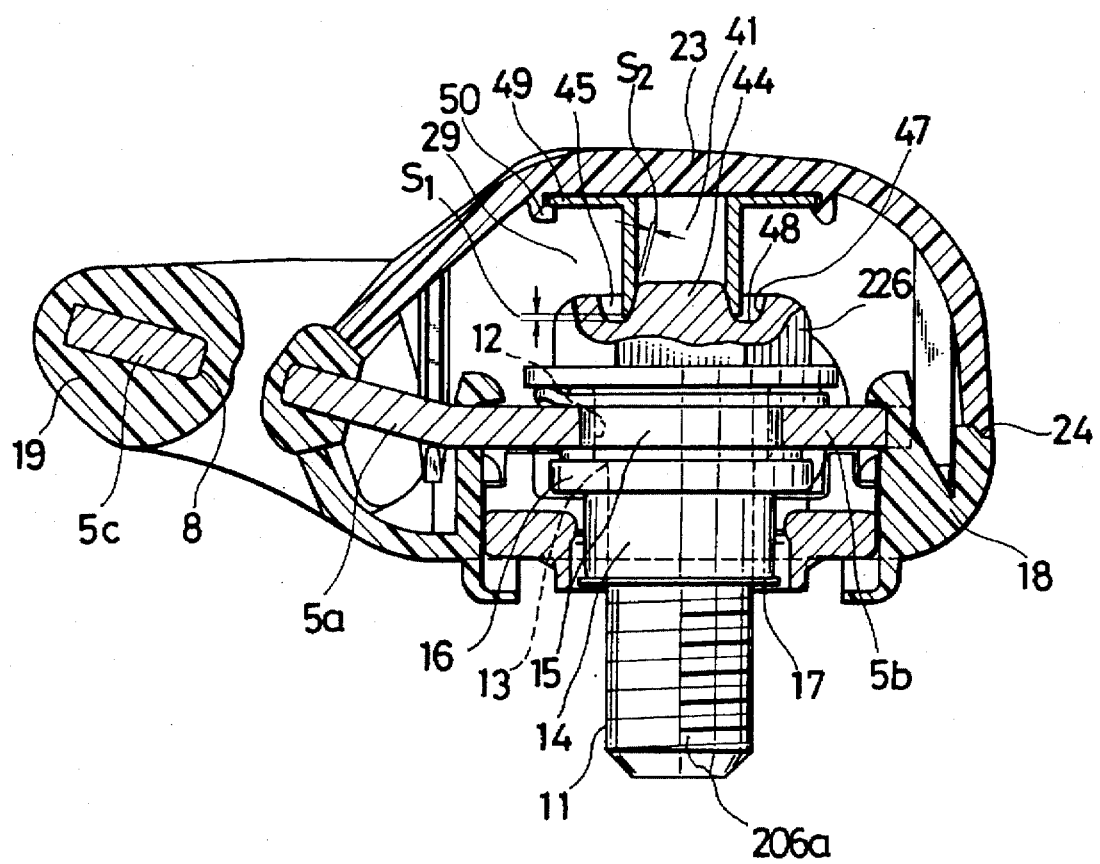
FIG. 11 is a cross-sectional view similar to FIG. 1 but illustrates a webbing anchorage according to a tenth embodiment of the present invention.
Figure 12:
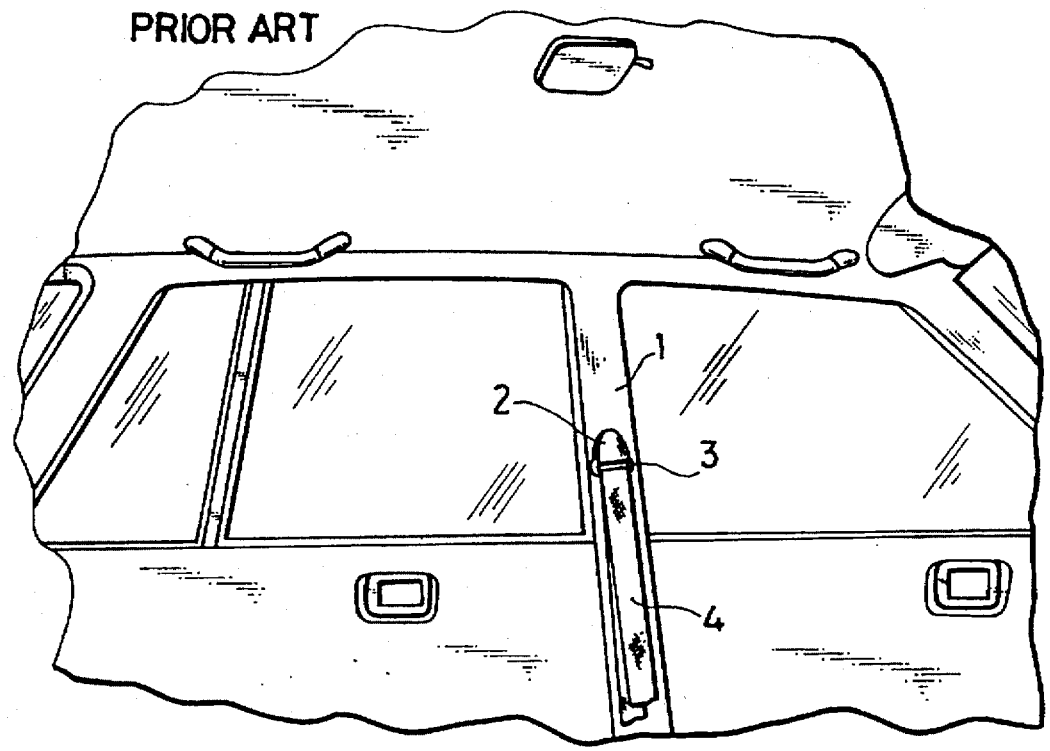
FIG. 12 is a perspective view showing the manner of mounting of a conventionally-known webbing anchorage for a seat belt system, as viewed from an interior side.
Figure 13:
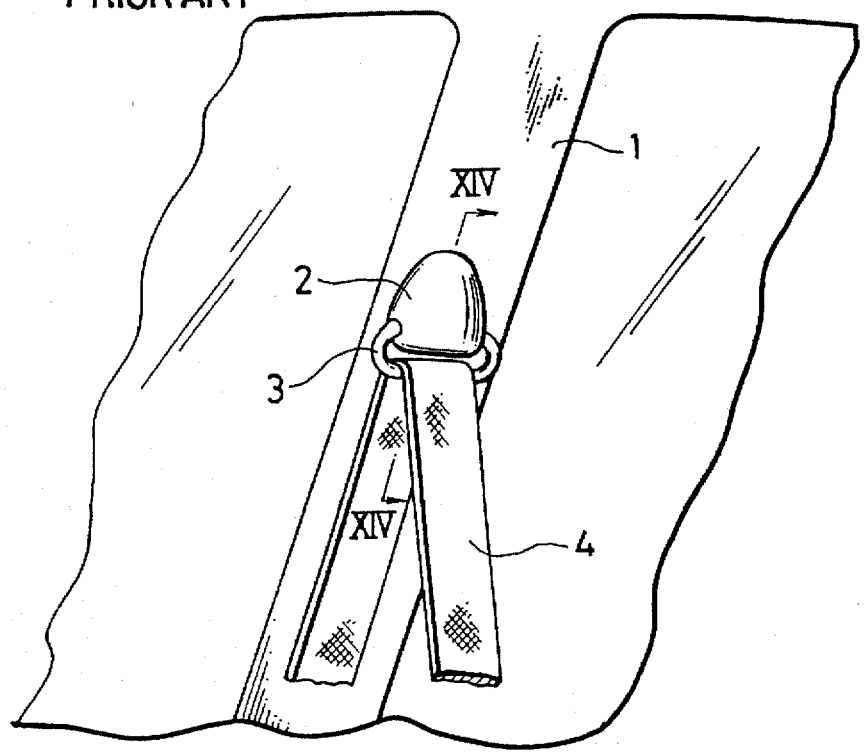
FIG. 13 is an enlarged perspective view of a central part of FIG. 12.
Figure 14:
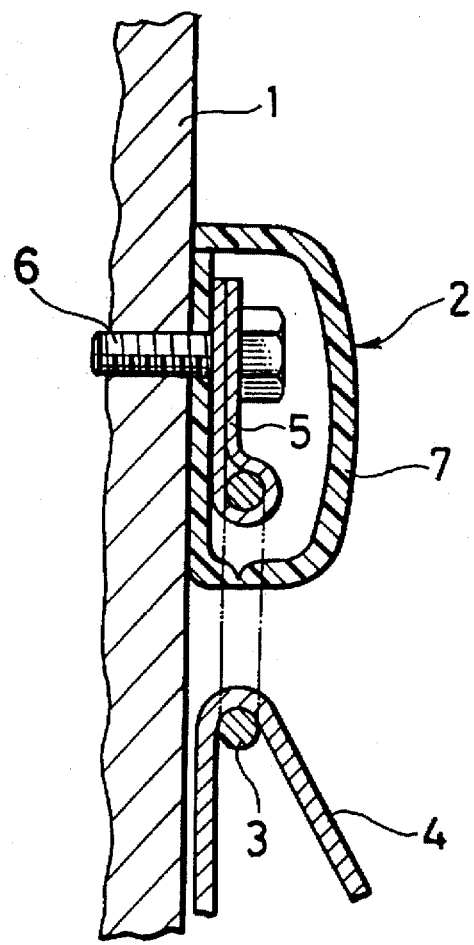
FIG. 14 is a cross-sectional view of a first example of conventional constructions, taken in the direction of arrows XIV—XIV in FIG. 13.
Figure 15:
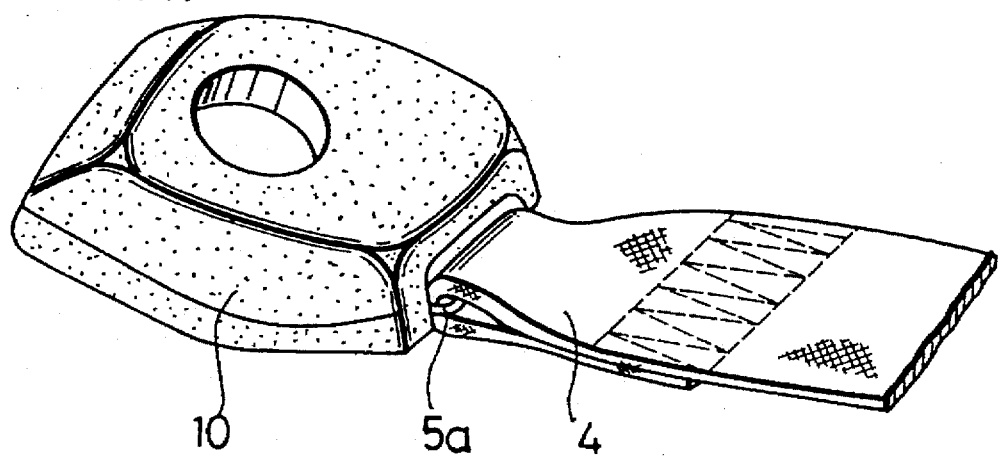
FIG. 15 is a perspective view of a second example of the conventional constructions.
Figure 16:
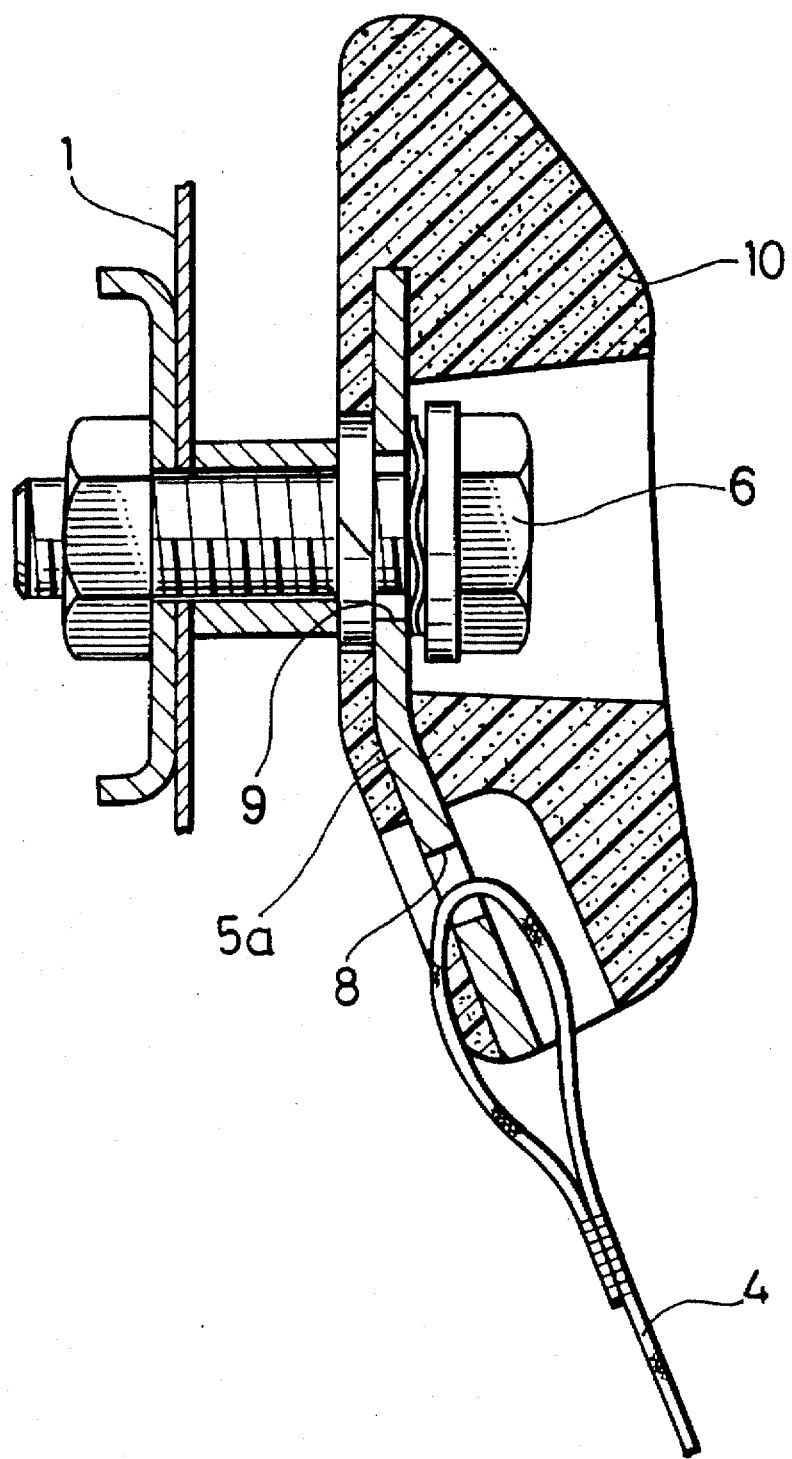
FIG. 16 is a cross-sectional view showing the second example in a mounted position.

FIG. 11 illustrates the tenth embodiment, in which the cylindrical rib in the ninth embodiment has been replaced by a flanged cylindrical rib 49 which is discrete from the upper cover 23 and is arranged on an inner wall of the upper cover 23. The mechanism of action for the absorption of the resulting impact energy is similar to that in the ninth embodiment. In the case of this embodiment, the flanged cylindrical rib 49 can be produced from a material different from the upper cover 23. It is therefore possible to achieve a desired level of impact energy absorption performance even when a limitation is imposed on the outer diameter and thickness, height of the cylinder of the flanged cylindrical rib, for example, due to the size of the space 29.

As the webbing anchorage according to the present invention has the above-described construction and acts as described above. Without being limited from the artistic appearance of an interior of an automotive vehicle, the head of an occupant can be effective protected in the event of a side collision. A car design which is safer and has good appearance is feasible.

What is claimed is:

1. A webbing anchorage for a seat belt system, comprising:
    a bolt having a recess;
    an anchor metal plate having a base portion and a free end portion, said base portion defining a bolt hole through which said bolt is inserted, and said free end portion defining a slot through which a webbing can extend supportedly;
    a lower cover extending over one side of said base portion of said anchor metal plate;
    a flexible upper cover chamber extending over at least an opposite side of the said base portion of said anchor metal plate; and
    a first impact-absorbing rib arranged within a space between an inner wall of said upper cover member and said recess of said bolt,
    wherein said first rib is guided along a wall of said recess and is deformated into a turned-back shape when an impact is applied from an outer wall of said upper cover.

2. A webbing anchorage according to claim 1, wherein said recess is in the form of a ring-shaped groove and forms a land surrounded by said ring-shaped groove, said land has a smaller cross-sectional area at a free end portion thereof than at a bottom portion thereof, and an outer wall of said ring-shaped groove is sloped so that an outer diameter of said ring-shaped groove increases toward an outer peripheral edge of said outer wall of said ring-shaped groove.

3. A webbing anchorage according to claim 1, wherein said first rib is cylindrical, and a wall of a free end portion of said first rib is tapered so that said wall of said free end portion of said first rib becomes smaller in cross-section toward a free end of said first rib.

4. A webbing anchorage according to claim 1, wherein said first rib is in the form of a flanged cylindrical rib attached to said upper cover member.

5. A webbing anchorage according to claim 1, further comprising second impact-absorbing ribs arranged between said inner wall of said upper cover and said opposite side of said base portion of said anchor metal plate.

6. A webbing anchorage for a seat belt system, comprising:
    a bolt having a head portion which has a top wall, and a threaded portion;
    an anchor metal plate having a base portion and a free end portion, said base portion defining a bolt hole through which said bolt is inserted with said head portion located on one side thereof, and said free end portion defining a slot through which a webbing can extend supportedly;
    a flexible upper cover member extending over at least a side of said base portion of said anchor metal plate, said side being on the side where said head portion is located, said cover having an inner wall, said inner wall and said top wall defining a space therebetween; and
    a substantially cylindrical impact-absorbing rib arranged within said space and having a free end portion at one end thereof, said free end portion terminating at a free end, and said rib having a wall with an inner diameter, said inner diameter increasing toward said free end so that said wall becomes smaller in cross-section toward the free end of said substantially cylindrical rib.

7. A webbing anchorage according to claim 6, wherein said substantially cylindrical rib is in the form of a flanged cylindrical rib attached to said upper cover member.

8. A webbing anchorage for a seat belt system, comprising:
    a bolt having a head portion and a threaded portion, said head portion having a top wall and a recess defined in said top wall;
    an anchor metal plate having a base portion and a free end portion, said base portion defining a bolt hole through which said bolt is inserted, and said free end portion defining a slot through which a webbing can extend supportedly;
    a flexible upper cover member extending over at least a side of said base portion of said anchor metal plate, said side being on the side where said head portion is located, said cover having an inner wall, said inner wall and said top wall defining a space therebetween; and
    a first impact-absorbing rib arranged within said space,
    wherein said first rib is guided along a wall of said recess, and is deformed into a turned-back shape when an impact is applied from an outer wall of said upper cover.

9. A webbing anchorage according to claim 8, wherein said recess is in the form of a ring-shaped groove and forms a land surrounded by said ring-shaped groove, said land has a smaller cross-sectional area at a free end portion thereof than at a bottom portion thereof, and an outer wall of said ring-shaped groove is sloped so that an outer diameter of said ring-shaped groove increases toward an outer peripheral edge of said outer wall of said ring-shaped groove.

10. A webbing anchorage according to claim 8, wherein said first rib is cylindrical, and a wall of a free end portion of said first rib is tapered so that said wall of said free end portion of said first rib becomes smaller in cross-section toward a free end of said first rib.

11. A webbing anchorage according to claim 8, wherein said first rib is in the form of a flanged cylindrical rib attached to said upper cover member.

12. A webbing anchorage according to claim 8, further comprising second impact-absorbing ribs arranged between said inner wall of said upper cover and said side of said base portion of said anchor metal plate.

* * * * *